United States Patent Office 3,558,731
Patented Jan. 26, 1971

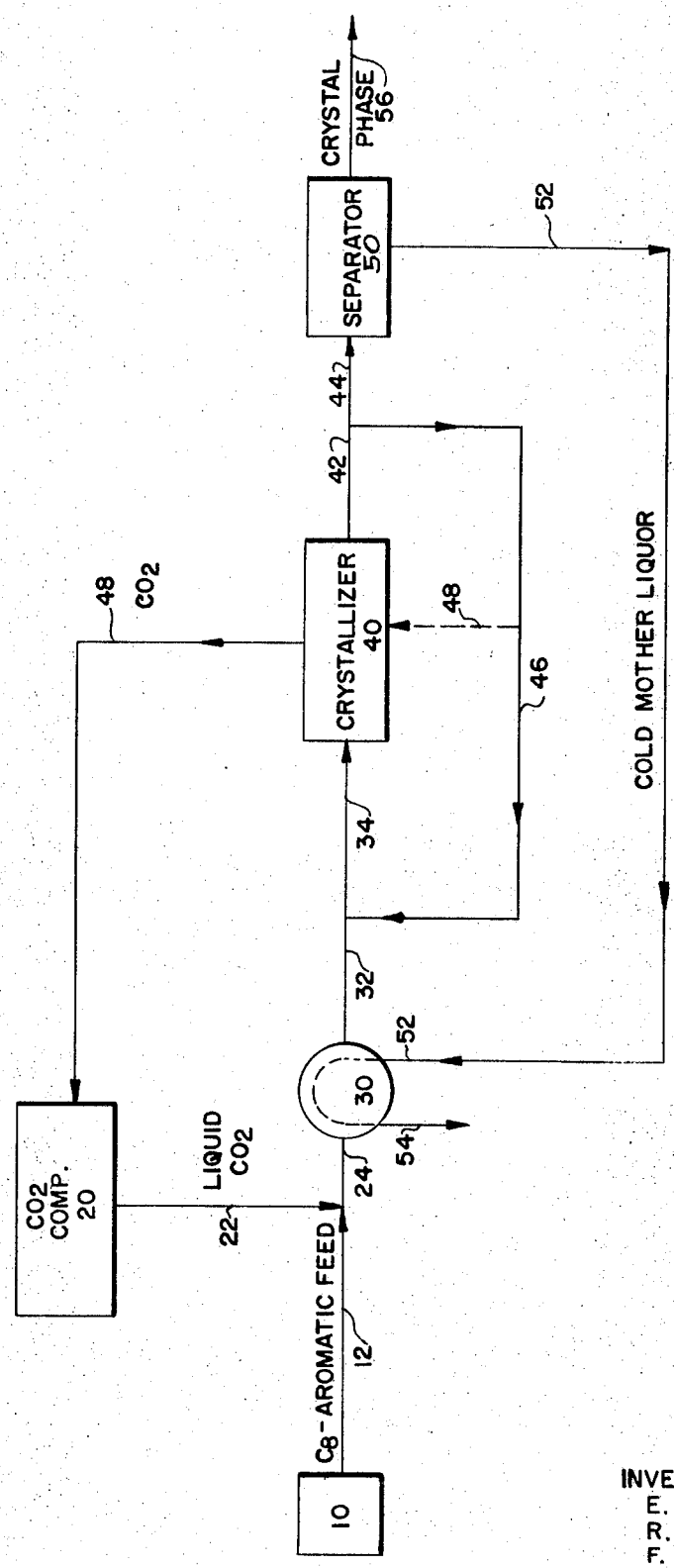

3,558,731
PARAXYLENE CRYSTALLIZATION
Eldred E. Young, Concord, Calif., Robert L. Wege, South Houston, Tex., and Frederick Kunreuther, Scarsdale, N.Y., assignors to Shell Oil Company, New York, N.Y., a corporation of Delaware
Filed Sept. 18, 1968, Ser. No. 760,462
Int. Cl. C07c 7/14
U.S. Cl. 260—674  2 Claims

ABSTRACT OF THE DISCLOSURE

Paraxylene is separated from xylene mixtures by premixing the xylene mixture with liquid carbon dioxide, precooling the resulting carbon dioxide-xylenes mixture by heat exchange with cold mother liquor effluent, contacting the chilled carbon dioxide-xylene feed mixture with a recycle slurry containing paraxylene crystals, and subsequently cooling and crystallizing p-xylene from the resulting slurry-containing mixture by evaporation of the carbon dioxide.

BACKGROUND OF THE INVENTION

It is known in the art to crystallize paraxylene from hydrocarbon mixtures comprising paraxylene and other isomeric $C_8$-aromatics by directly contacting the hydrocarbon mixture with a liquid refrigerant such as liquefied ethane, ethylene, methane or carbon dioxide. For example, the use of carbon dioxide as a refrigerant is disclosed by U.S. 2,533,232 of Dressler, issued Dec. 12, 1950, and U.S. 2,659,763 of Humphreys et al., issued Nov. 17, 1953. In such prior processes it appears that there has been an attempt to avoid precooling of the incoming xylene stream to a temperature below the crystallization point of the xylene stream as such precooling generally adversely effects paraxylene recovery, tends to lower the purity of product and produces undesirably fine crystals. It would be of advantage, however, to reduce the refrigeration load of paraxylene crystallization by employing mother liquor effluent of the crystallization process to precool the incoming xylene stream to a temperature below the crystallization point of the xylene feed, but without adversely effecting product purity or forming undesirably fine crystals.

SUMMARY OF THE INVENTION

It has now been found that improved crystallization of paraxylene from hydrocarbon feed mixtures containing paraxylene, metaxylene, orthoxylene, ethylbenzene and other closely boiling hydrocarbons is effected by: (1) premixing the feed mixture with a selected proportion of liquid carbon dioxide; (2) precooling the resulting carbon dioxide-feed mixture with a cold mother liquor effluent stream by indirect heat exchange to a temperature below the crystallization point of the feed mixture but above the crystallization point of the carbon dioxide-feed mixture; (3) contacting the resulting carbon dioxide-feed mixture with a recycle crystal slurry phase of the same hydrocarbon composition as the hydrocarbon feed; and (4) cooling the resulting slurry-containing mixture by evaporation of the carbon dioxide to crystallize paraxylene. The crystallization procedure of the process of the invention is characterized by requiring reduced amounts of carbon dioxide refrigerant and producing paraxylene crystals of relatively large size which drain readily in the separation step.

BRIEF DESCRIPTION OF DRAWING

The invention is further described with reference to the accompanying drawing in which the sole figure is in the form of a diagrammatic flow sheet illustrating a preferred mode for carrying out the present invention.

Turning now specifically to the drawing, 10 designates a charge tank containing a liquid mixture of hydrocarbons which may contain ethylbenzene, paraxylene, metaxylene and orthoxylene. The feed stock from tank 10 is withdrawn via line 12 and admixed with a selected amount of liquid $CO_2$ introduced by 22 from a $CO_2$ compressor and storage unit 20 to form an essentially homogeneous liquid $CO_2$-feed stock mixture. The mixture is then passed via line 24 into heat exchanger 30 where the temperature of the mixture is lowered below the crystallization point of the feed stock but above the crystallization point of the $CO_2$-feed stock mixture by indirect heat exchange with cold mother liquor effluent from separator 50. This mother liquor flows through inlet conduit 52 and outlet conduit 54.

The chilled $CO_2$-feed stock mixture is withdrawn from heat exchanger 30 and admixed with a portion of chilled slurry of the same hydrocarbon composition as the feed stock introduced by line 46. The resulting slurry-$CO_2$-feed stock mixture is then passed via line 34 into crystallizer 40 wherein the feed stock is cooled by evaporation of the liquid $CO_2$ to form the slurry comprising a crystal phase of paraxylene. The $CO_2$ is removed by line 48 to compressor unit 20 wherein the $CO_2$ is re-liquefied for further use. The substantially $CO_2$-free crystal slurry phase is withdrawn from the crystallizer 40 through line 42 and the stream split with a portion passing through line 46 for admixture with the $CO_2$-feed stock mixture in line 32 and the remainder passed through a branch line 44 to the separator 50 wherein a crystal cake of paraxylene is separated and withdrawn through line 56 and the cold mother liquor employed for indirect heat exchange cooling of the $CO_2$-feed stock in line 24 is withdrawn through line 52. Line 48 is provided for introducing the crystal slurry phase directly into the crystallizer 40.

DESCRIPTION OF THE PREFERRED EMBODIMENTS

The separation process of the invention is broadly applicable to the recovery of paraxylene from any hydrocarbon mixture consisting predominantly of xylene isomers and having a paraxylene content of at least about 10% by weight, preferably from about 10% to 25% by weight. Suitable xylene-rich hydrocarbon mixtures generally comprise 10% to 15% wt. ethylbenzene, 10% to 25% wt. orthoxylene, 40% to 50% wt. metaxylene, 10% to 25% wt. paraxylene and up to 15% wt. of paraffinic and other aromatic hydrocarbons boiling in the boiling range of xylenes. A typical feed stock has an ASTM boiling point range of from about 270° F. to 300° F. and contains 1.8% wt. toluene, 13.6% wt. ethylbenzene, 23.2% wt. paraxylene, 41.5% wt. metaxylene and 19.9% wt. orthoxylene.

Essential features of the process are premixing the liquid $CO_2$ refrigerant with the xylene feed stock and indirectly precooling the resulting $CO_2$-xylene feed stock mixture with cold mother liquor effluent. By pre-mixing the xylene feed and liquid $CO_2$ refrigerant, the paraxylene concentration in the $CO_2$-feed stock mixture is reduced in comparison to the paraxylene concentration in the feed stock. This reduced paraxylene concentration of the $CO_2$-feed stock mixture permits indirect precooling of the mixture to a substantially lower temperature (at least 5° C. up to about 10° C. lower) without crystallization of xylene on heat exchanger surfaces thereby effecting maximum utilization of the cold mother liquor effluent and reducing the amount of liquid $CO_2$ refrigerant required to maintain crystallizer operating temperature. For example, precooling of a xylene feed stock containing about 23% wt. paraxylene is limited to a temperature of about −38° C. by the freezing point of the xylene feed. In contrast, the premixing of the same xylene feed stock to contain about 23% wt. liquid $CO_2$ reduces the freezing point to about $-48°$ C. Consequently, the cold mother liquid stream can be utilized by indirect heat exchange to cool the $CO_2$-feed mixture below the temperature of $-38°$ C.

Liquid $CO_2$ is admixed with the xylene feed mixture in amount sufficient to cool the crystallization zone to a temperature of from about $-60°$ C. to $-80°$ C., preferably from about $-65°$ C. to $-75°$ C. In general, the amount of liquid $CO_2$ admixed with the xylene feed mixture ranges from about 15% to 35% by weight based on xylene feed, preferably from about 20% to 30% by weight on the same basis.

The efficiency of the separation process resulting from premixing the xylene feed with the liquid $CO_2$ refrigerant and precooling of the $CO_2$-xylene feed mixture with cold mother liquid is dependent in part upon the admixing of a portion of the cold slurry formed from the xylene feed mixture in the crystallization by the evaporation of the liquid $CO_2$. Although it is not known with certainty, it is thought that the slurry recycle promotes more efficient crystallization by virtue of reducing the liquid $CO_2$ content of the $CO_2$-feed mixture prior to the evaporation of the $CO_2$ thereby avoiding rapid cooling, i.e., shock cooling, of the xylene feed, which generally tends to produce undesirably fine crystals which can be separated from the mother liquid only with great difficulty if at all. The slurry recycle additionally serves to reduce the temperature of the $CO_2$-feed mixture a small amount, ranging from 2° C. to about 15° C., but generally above the crystallization point of the mixture in general, the volume ratios of recycled slurry to $CO_2$-feed mixture vary from about 0.5:1 to about 5:1 with volume ratios varying from about 1:1 to about 2:1 being preferred:

The remainder of the slurry produced in the crystallization zone is passed to the separator unit to produce a crystal mass comprising paraxylene and the cold mother liquor effluent employed for indirect cooling of the $CO_2$-xylene feed mixture. The separator unit employed comprises more or less conventional equipment, for example, a basket or bowl-type centrifuge.

The crystal cake of paraxylene is generally subjected to further crystallization steps to obtain paraxylene of increased purity. Of course, it should be appreciated that any cold mother liquor effluent from a subsequent crystallization step is also suitably employed for precooling of the $CO_2$-xylene feed mixture stream of a prior or subsequent crystallization step as an advantage of the process of the invention resides in the maximum utilization of cold mother liquor effluent streams for decreasing the overall refrigeration load of paraxylene separations.

To further illustrate the improved process of the invention, the following examples are provided. It should be understood that the details thereof are not to be regarded as limitations as they may be varied as will be understood by one skilled in the art.

EXAMPLE I

A mixed xylene feed containing 1.8% wt. toluene, 13.6% wt. ethylbenzene, 23.2% wt. paraxylene, 41.5% wt. metaxylene and 19.9% wt. orthoxylene was admixed with 23% wt. liquid $CO_2$ and the resulting $CO_2$-xylene feed mixture was cooled to $-45°$ C. by indirect heat exchange with a cold ($-69°$ C.) mother liquor effluent. The chilled $CO_2$-xylene feed mixture was then admixed with an equal volume of a cold ($-69°$ C.) recycle slurry and pumped at a rate of 1800 lb./hr. into a draft-tube crystallizer maintained at a pressure of 14.7 p.s.i.a. and at a temperature of about $-72°$ C. by the evaporation of liquid $CO_2$ present in the xylene feed mixture. The crystallizer residence time was 1 hour. The resulting slurry was withdrawn from the crystallizer and the slurry stream was split with a portion employed for recycle to the $CO_2$-xylene feed mixture and the remainder passed at a rate of 1200 lb./hr. to a bowl-type centrifuge operated at 800 r.p.m. wherein the slurry was separated into a crystal cake and the mother liquor effluent employed for indirect cooling of the $CO_2$-xylene feed mixture stream. The crystal cake contained 60.9% by weight paraxylene and the mother liquor contained 8.6% by weight paraxylene.

EXAMPLE II

The xylene feed mixture employed in Example I was crystallized and the resulting slurry product mixture was separated under operating conditions identical to Example I, except that the slurry was not recycled to the $CO_2$-xylene feed mixture. The crystal cake obtained contained 55.3% by weight paraxylene and the mother liquor effluent contained 11.7% by weight paraxylene.

EXAMPLE III

The xylene feed mixture employed in Example I was crystallized and the resulting slurry mixture was separated under operating conditions identical to Example I, except that the same amount of slurry was recycled directly into the crystallizer without prior admixture with the $CO_2$-xylene feed mixture. The crystal cake obtained contained 55.7% by weight paraxylene and the mother liquor effluent contained 10.1% by weight paraxylene.

We claim as our invention:

1. A process for the recovery of paraxylene from a multicomponent liquid feed stock comprising substantial amounts of orthoxylene, metaxylene and paraxylene which comprises:
   (a) premixing the feed stock with liquid carbon dioxide refrigerant;
   (b) precooling the resulting carbon dioxide-feed stock mixture with cold mother liquor effluent produced as defined herein, by indirect heat exchange, to a temperature below the crystallization point of the feed stock but above the crystallization point of the carbon dioxide-feed stock mixture;
   (c) admixing the precooled carbon dioxide-feed stock mixture with a portion of substantially carbon dioxide-free recycle crystal slurry phase of the same hydrocarbon composition as the feed stock, the volume ratio of slurry to carbon dioxide-feed stock mixture being about 0.5:1 to about 5:1;
   (d) cooling the resulting slurry-carbon dioxide-feed stock mixture in a crystallization zone by evaporation of the carbon dioxide to form further crystal slurry phase; and
   (e) splitting the substantially carbon dioxide-free crystal slurry phase into the portion employed for admixture with the carbon dioxide feed stock mixture, and a remainder which is separated into a paraxylene-containing crystal product phase and a cold mother liquor effluent.

2. The process of claim 1 wherein the feed stock contains from about 10% by weight to about 25% by weight paraxylene.

References Cited

UNITED STATES PATENTS

| | | | |
|---|---|---|---|
| 2,533,232 | 12/1950 | Dressler | 260—674 |
| 2,659,763 | 11/1953 | Humphreys et al. | 260—674 |
| 2,766,310 | 10/1956 | Bennett et al. | 260—674 |
| 2,848,519 | 8/1958 | Corneil et al. | 260—674 |
| 3,467,724 | 9/1969 | Laurich | 260—674 |

DELBERT E. GANTZ, Primary Examiner

C. E. SPRESSER, JR., Assistant Examiner

U.S. Cl. X.R.

62—58